United States Patent [19]
Obata et al.

[11] Patent Number: 5,816,108
[45] Date of Patent: Oct. 6, 1998

[54] ASSEMBLED WRIST FOR INDUSTRIAL ROBOT INCLUDING A PROTECTIVE MEMBER

[75] Inventors: Mitsuyoshi Obata; Yoshikuni Tsukahara; Satoru Nakamura; Toshihiro Nagatani, all of Toyohashi, Japan

[73] Assignee: Kabushiki Kaisha Kobe Seiko Sho, Kobe, Japan

[21] Appl. No.: 722,217

[22] PCT Filed: Feb. 19, 1996

[86] PCT No.: PCT/JP96/00370

§ 371 Date: Oct. 21, 1996

§ 102(e) Date: Oct. 21, 1996

[87] PCT Pub. No.: WO96/26045

PCT Pub. Date: Aug. 29, 1996

[30] Foreign Application Priority Data

Feb. 21, 1995 [JP] Japan .................................. 7-058107

[51] Int. Cl.[6] ............................... B25J 17/02; B25J 19/00
[52] U.S. Cl. .......................... 74/490.05; 901/29; 138/121
[58] Field of Search .......................... 74/490.01, 490.02, 74/490.05; 901/28, 29, 26; 414/729; 138/109, 119, 121

[56] References Cited

U.S. PATENT DOCUMENTS 4,688,983  8/1987  Lindbom .................................. 901/26
4,703,668  11/1987  Peter ........................................... 901/26
4,708,580  11/1987  Akeel ......................................... 901/26
4,819,970  4/1989  Umehara .................................. 138/121
4,864,888  9/1989  Iwata .......................................... 901/28
5,549,016  8/1996  Nakako et al. ............................ 901/29

FOREIGN PATENT DOCUMENTS 58-59785  4/1983  Japan .
61-33887  2/1986  Japan .
4-46720  7/1992  Japan .

*Primary Examiner*—Charles A. Marmor
*Assistant Examiner*—David M. Fenstermacher
*Attorney, Agent, or Firm*—Oblon, Spivak, McClelland, Maier & Neustadt, P.C.

[57] ABSTRACT

A assembled wrist for use on an industrial robot having a final-axis arm (2) includes passage (45) formed by first, second and third spaces arranged in series. The passage extends from a third driver tube (9) in the final-axis arm (2) to one end surface of a tool support portion (5). A protective member (50) has ends fixed and sealed to the third driver tube (9) and the tool support portion (5) respectively so that the protective member (50) may be disposed in the passage (45). The protective member has flexible components (62) at least near the fixed and sealed ends so that the flexible component (62) deforms according to the rotations of the third driver tube (9) and the tool support portion (5).

13 Claims, 4 Drawing Sheets

ASSEMBLED WRIST FOR INDUSTRIAL ROBOT INCLUDING A PROTECTIVE MEMBER

DESCRIPTION

1. Technical Field

The present invention relates to a assembled wrist for use on an industrial robot and, more particularly, to a assembled wrist which is provided with a cylindrical passage to protect hoses, cables, and so on housed in the passage from harmful and harsh external environment.

2. Background Art

A conventional assembled wrist for use on an industrial robot is described in Japanese Patent Publication No. 46720/1992. This kind of assembled wrist comprises three independent axes of rotation meeting each other at two points spaced from each other, a first housing, a second housing and a tool support member. These first housing, second housing and tool support member are rotated by mechanical components such as toothed wheels or bearings about the three independent axes of rotation. The first housing, the second housing and the tool support member are arranged in series. These members are made hollow such that a cylindrical passage extends through these members. Hoses, cables, conduits, etc. for supplying air and electric power to a working tool are passed through this cylindrical passage. The working tool mounts to a mounting surface of the tool support member.

The working tool mounting the tool support member is brought to a desired working posture by rotating the first housing, the second housing and the tool support member about the three independent axes of rotation independently.

In the prior art assembled wrist for use on an industrial robot, the first housing, the second housing, and the tool support member are rotated independently by a mechanical component such as a toothed wheel or bearing. Small openings exist naturally between the toothed wheel and bearing. Therefore, lubricant is supplied to smoothen the rotation of the toothed wheel or bearing and also dust comes from the machine or outside into the cylindrical passage through these small openings. As a result, the lubricant and dust adversely affect the hoses, cables, and conduits.

Walls of the cylindrical passage is constituted of walls of the first and second housings arranged in series. The walls of the first and second housings rotate relatively each other according to changing respect to the posture of the wrist. On boundary of the walls of the first and second housings, a shearing force caused from the relative rotation operates on the hoses, cables, etc, and then the hoses, cables, etc are locally twisted. As a result, they will be impaired.

The present invention has been made to solve this problem. It is an object of the present invention to provide a assembled wrist which is for use on an industrial robot and which can guard hoses, cables, conduits, etc. passed through a cylindrical passage formed in the assembled wrist from harmful and harsh external environment.

DISCLOSURE OF THE INVENTION

The above object is achieved by the present invention of a assembled wrist for use on an industrial robot comprising;

first, second, and third driver tubes coaxially arranged in this order from outside and disposed in a final-axis arm of the robot;

a first wrist portion connected to the first driver tube and rotated about a first axis by a mechanical component so as to form a first space around the first axis;

a second wrist portion of which one end is connected to the second driver tube with gears equipped inside of the first wrist portion and which is rotated about a second axis by a mechanical component so as to form a second space around the second axis which intersects the first axis;

a tool support portion of which one end is connected to the third driver tube with gears equipped inside of the first and second wrist portions and other end is connected to a working tool, and which is rotated about a third axis by a mechanical component so as to form a third space around the third axis which intersects the second axis;

passage formed by the above first, second and third spaces arranged in series, which extends from the third driver tube in the final-axis arm to one end surface of the tool support portion; and a protective member of which both ends are fixed and sealed to the third driver tube and the tool support portion respectively so that the protective member may be disposed in the passage, and which has flexible components at least near the fixed and sealed ends of which the flexible component deforms according to the rotations of the third driver tube and the tool support portion.

The protective member is made of an elastically deformable material such as rubber or resin and has continuous corrugations at least near the fixed and sealed ends so as to be flexible. Small openings from the passage towards outside exist in the first wrist portion, the second wrist portion and the tool support portion forming the passage due to a mechanical component such as a toothed wheel or bearing. Seal members are stuck on the small openings to close off them, so that a interior space is made between the wall of the passage and the outer surface of the protective member. The interior space is filled with lubricant.

In one aspect of the present invention, the protective member is guided by sliding members disposed inside the passage.

According to the present invention of the assembled wrist for use on an industrial robot, the hoses, cables, conduits, etc. for supplying air and electric power are laid in the protective member accommodated within the passage. Therefore, the lubricant for smoothing the rotation of bearings or the like and dust coming from outside of the machine never contact with the hoses etc. directly and the lubricant and dust would not affect.

Even if the third driver tube or the like rotates, the protective member deforms according to the rotation. Therefore a shearing force, caused from the relative rotation on boundary of the walls of the first and second housings, does not affect on the hoses, cables, etc. Accordingly, the hoses, cables, etc. are prevented from being deteriorated.

Furthermore, the seal members are stuck on the small openings in the first wrist portion, second wrist portion and tool support portion forming the passage. These seal members cooperate with the protective member to ensure that the passage is hermetically sealed. This makes it possible to inject lubricant into the interior space between the walls of the passage and the outer surface of the protective member. Hence, the protective member can be deformed according to the rotation of the first wrist portion or the like while reducing the friction between the passage and the protective member.

As a result, the friction between the protective member and the passage decreases, thus the damage and deterioration are reduced. Also, it is assured that the lubricant supplied to the gears, bearings etc. and dust outside the machine do not enter the passage. The hoses, cables, conduits, etc. passed through the passage can be guarded against harsh external environment by the protective member.

When the protective member is guided by a sliding member disposed in the passage, the protective member can be also deformed according to the rotation of the first wrist portion and so on while reducing the friction between the passage and the protective member.

BEST MODE FOR CARRYING OUT THE INVENTION

Figure 1:
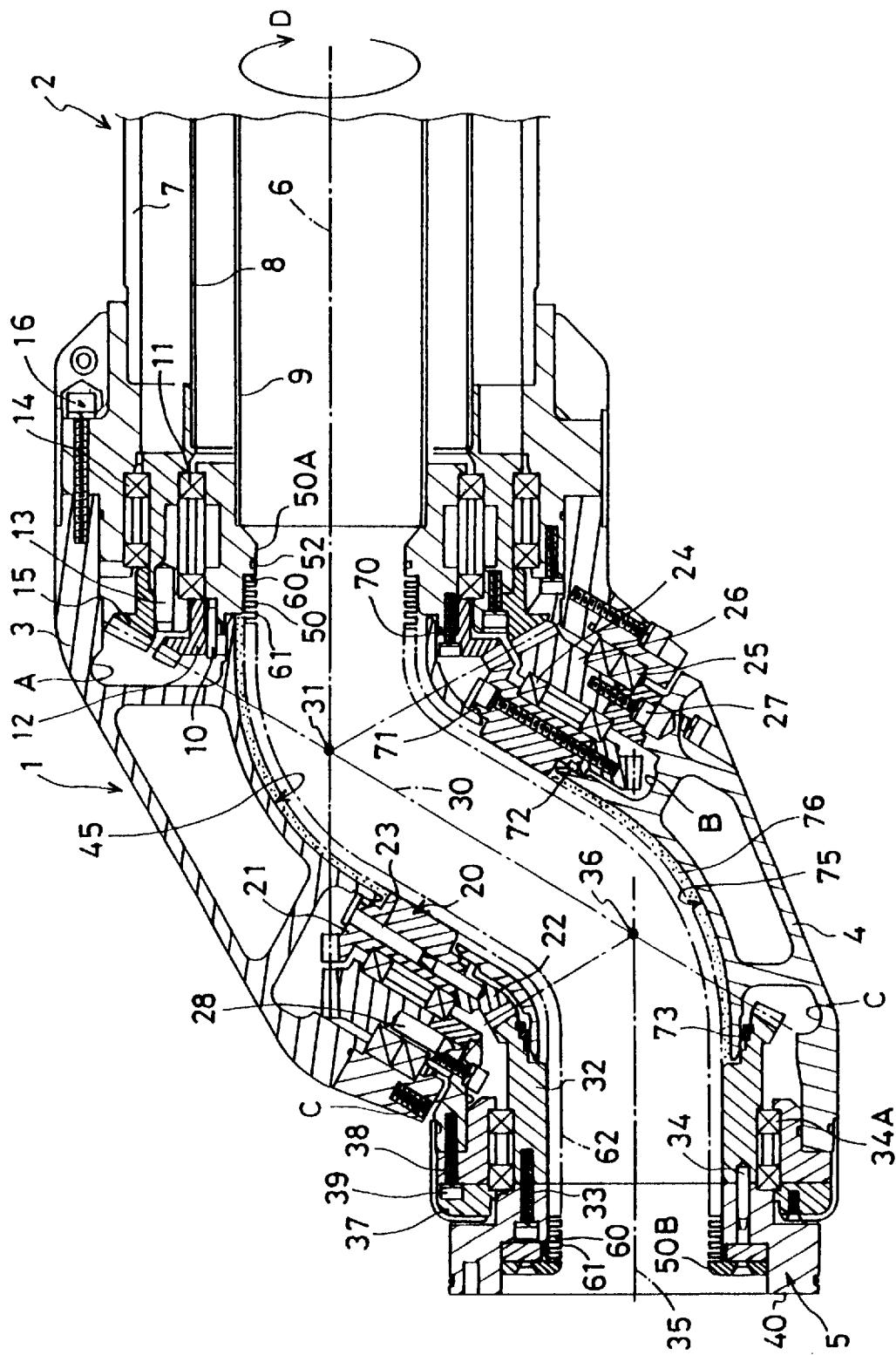
FIG. 1 is a cross-sectional view of a assembled wrist according to the present invention, the assembled wrist being for use on an industrial robot.
Figure 2A:
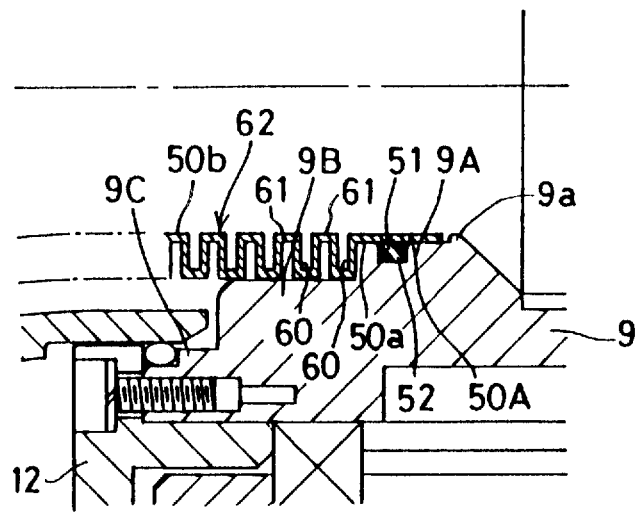
FIG. 2(a) is an enlarged view of main portions with respect to a fixing structure of a protective member in the assembled wrist shown in FIG. 1, and in which a protective member is hermetically fixed to a driver tube in a final-axis arm.
Figure 2B:
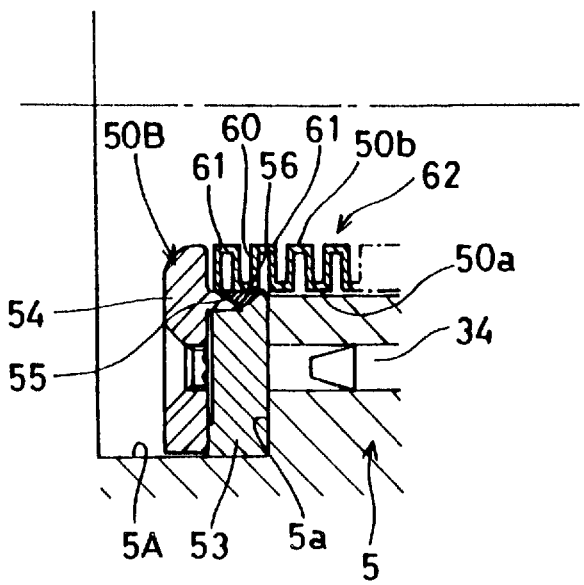
FIG. 2(b) is an enlarged view of main portions with respect to a fixing structure of the protective member in the assembled wrist shown in FIG. 1, and in which the protective member is sealably mounted to a tool support portion.
Figure 3A:
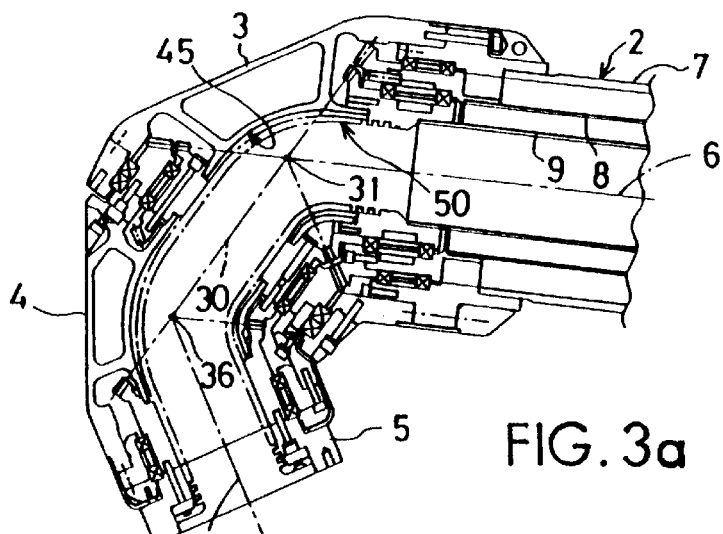
FIG. 3(a) is a cross-sectional view of the assembled wrist shown in FIG. 1, illustrating the operation of the assembled wrist.
Figure 3B:
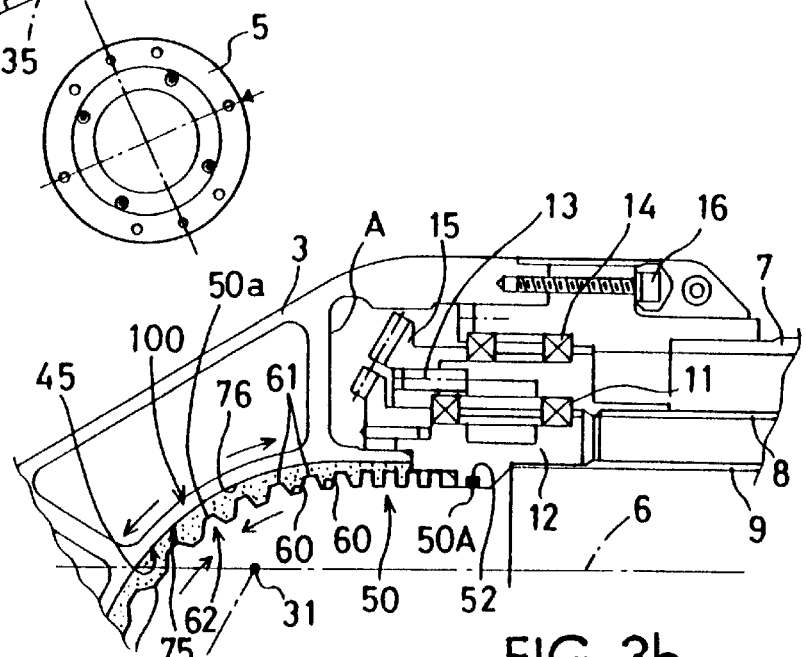
FIGS. 3(b) and 3(c) are enlarged views of main portions of FIG. 3(a), illustrating the flexibility of the protective member.
Figure 3C:
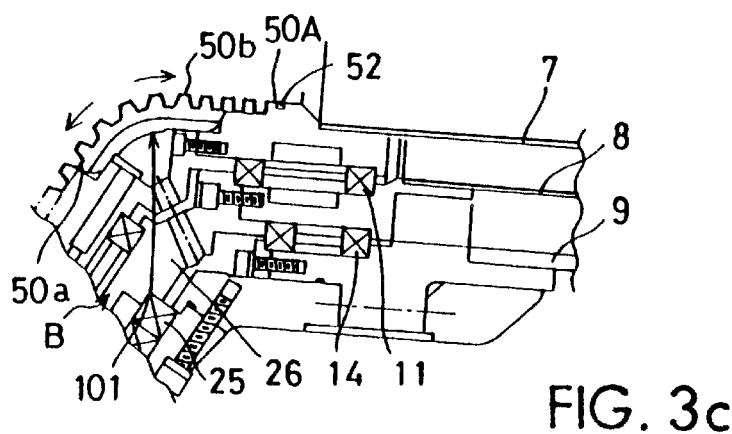
Figure 4:
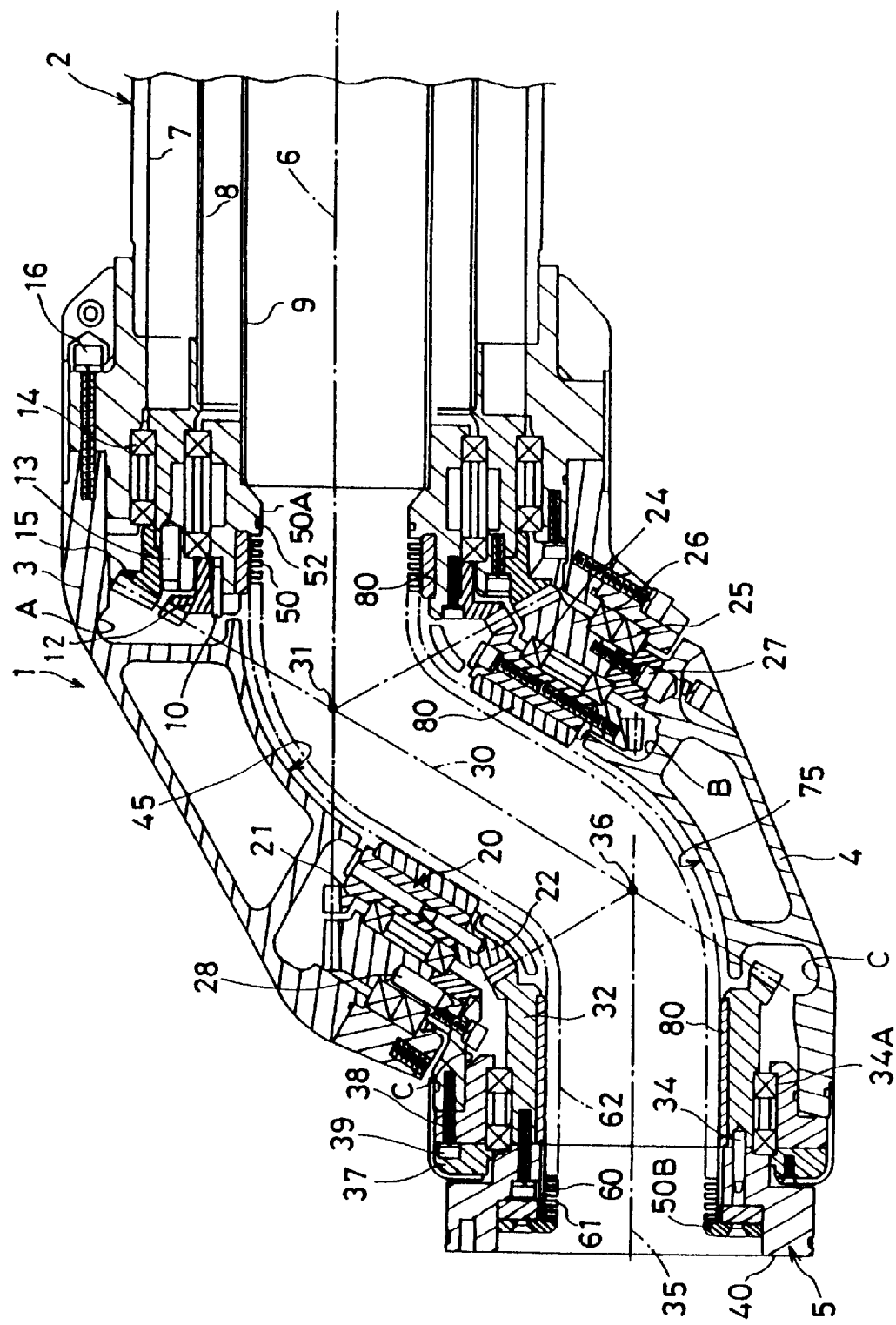
FIG. 4 is a cross-sectional view of a modification of the assembled wrist shown in FIG. 1.

A wrist assembled according to the present invention and mounted on an industrial robot is hereinafter described with reference to the accompanying drawings. FIG. 1 is a cross-sectional view of the assembled wrist for the industrial robot. FIGS. 2(a) and 2(b) are enlarged views of main portions of a structure for mounting a protective member to the assembled wrist for the industrial robot. FIGS. 3(a)–3(c) illustrate the operation of the assembled wrist and the flexibility of the protective member. FIG. 4 is a cross-sectional view of a modification of the above-described assembled wrist for the industrial robot.

Referring to FIG. 1, a assembled wrist 1 is connected to the front end of a final-axis arm 2 of an industrial robot. This assembled wrist 1 comprises a first wrist portion 3, a second wrist portion 4 and a tool support portion 5. The first wrist portion 3 has a first axis 6 and a space A for accommodating gear at its end on the side of the final-axis arm 2. A first driver tube 7, a second driver tube 8 and a third driver tube 9, which constitute the final-axis arm 2, are coaxially arranged around the first axis 6 in this order from outside.

The assembled wrist 1 can be easily connected to the final-axis arm 2 at the side of the first wrist portion 3 by a structure described now. The innermost third driver tube 9 is connected to a bevel gear 12 with a driver pin 10. The bevel gear 12 is accommodated in the space A and rotatably held by a bearing 11. The space A accommodates gears inside the first wrist portion 3. The second driver tube 8 is connected to a bevel gear 15 with a driver pin 13. The bevel gear 15 is accommodated in the space A and rotatably held by a bearing 14. The first driver tube 7 is connected to the first wrist portion 3 with a bolt 17.

One end of the second wrist portion 4 is connected to the other end of the first wrist portion 3 so as to form a space B together with the first wrist portion 1. The space B is used for accommodating a bevel gear body 20 and a bevel gear 26. The bevel gear 26 is connected to the second wrist portion 4 with a bolt 27 and secured by a pin 28 so as to mesh with the bevel gear 15. The second wrist portion 4 can be rotated about a second axis 30 by bearings 24 and 25. The second axis 30 meets the first axis 6 at an intersection 31 with a given angle.

The bevel gear body 20 is in mesh with the bevel gear 12 and rotated by rotation of the third driver tube 9. This bevel gear body 20 consists of a pair of bevel gear halves 21 and 22. These bevel gear halves 21 and 22 are coupled together with the bolts and secured by a pin 23 and rotatably held by the bearing 24.

Retainers 37 and 38 are fixed to the other end of the second wrist portion 4 by bolts 39 so as to form a space C for accommodating gears. An output bevel gear 32 connected to the tool support portion 5 is accommodated in this space C. The output bevel gear 32 is connected to the tool support portion 5 by bolts 33 so as to mesh with the bevel gear half 22 of the bevel gear body 20, and is secured to the tool support portion 5 by a pin 34. A bearing 34A is rotatably fitted to the retainer 38.

The tool support portion 5 is rotatably held by the bearing 34A so as to be rotatable about the third axis 35. This third axis 35 meets the second axis 30 at an intersection 36 with a given angle. This intersection 36 is spaced a given distance from the intersection 31.

In the present embodiment, the assembled wrist 1 has a cylindrical passage 45. The cylindrical passage 45 extends along the first, second and third axes 6, 30, 35 from the final-axis arm 2 to an end surface 40 of the tool support portion 5 on which a working tool is to be mounted. And the cylindrical passage 45 is continuously formed in the first wrist portion 3, the second wrist portion 4 and the tool support portion 5 arranged in series. Hoses, cables, conduits and so on for supplying air and electric power used for operation of the working tool are accommodated in the cylindrical passage 45.

A cylindrical member 50 forming a protective member is disposed inside the cylindrical passage 45 between the tool support portion 5 and the third driver tube 9 in the final-axis arm 2. An inside space of the cylindrical passage 45 is covered with this cylindrical member 50.

The structure for fixing the cylindrical member 50 in the cylindrical passage 45 is next described by referring to FIGS. 2(a) and 2(b). FIG. 2(a) shows a portion at which the cylindrical member is fixed to the third driver tube 9. The third driver tube 9, whose diameter gradually increases toward the tool support portion 5, comprises a small diameter portion 9A, an intermediate diameter portion 9B, and a large diameter portion 9C. The cylindrical member 50 has one end portion 50A fitted in the small diameter portion 9A of the third driver portion 9. The end portion 50A engages a protruding portion 9a of the small diameter portion 9A. An annular groove 51 is formed in the inner surface of the small diameter portion 9A of the third driver tube 9. An annular seal 52 is fitted in the annular groove 51. Whereby, the outer surface 50a of the cylindrical member 50 is resiliently in contact with the inner surface of the third driver tube 9. Consequently, one end portion 50A of the cylindrical member 50 is brought into a hermetically fixed state.

FIG. 2(b) shows the portion at which the cylindrical portion is fixed to the tool support portion 5.

The tool support portion 5 is provided with a recessed hole 5A opening toward a surface for fixing a working tool.

the recessed hole 5A has a bottom portion 5a. An annular member 53 is fitted in the bottom portion 5a. The other end portion 50B of the cylindrical member 50 is fitted into an internal circumferential surface of the annular member 53. And an annular support member 54 is inserted between the internal circumferential surface of the annular member 53 and the other end portion 50B of the cylindrical member 50. Whereby, the other end portion 50B of the cylindrical member 50 is fixed to the tool support portion 5. An annular seal 56 is fitted in an annular groove 55 formed by the annular member 53 and the annular support member 54.

The annular groove 55 has substantially V-shaped cross section. As a result of the annular seal 56, the outer surface 50a of the cylindrical member 50 is resiliently in contacted with the inner surface of the tool support portion 5. Consequently, one end portion 50B of the cylindrical member 50 is brought into a hermetically fixed state.

The cylindrical member 50 is made from a material capable of being resiliently deformed such as rubber or resin. As shown in FIGS. 2(a) and 2(b), corrugations 62 extend between both ends 50A and 50B of the cylindrical member 50. The corrugations 62 are formed by folding the outer surface 50a and the inner surface 50b radially and successively. The cylindrical member 50 deforms according to rotary movements of the first wrist portion 3, the second wrist portion 4 and the tool support portion 5 with stretching and contracting the concave portions 60 and convex portions 61 constituting the corrugations 62. That is, flexibility is given to the cylindrical member 50.

In the present embodiment, the assembled wrist 1 has the spaces A–C for accommodating gears formed in the first wrist portion 3 and in the second wrist portion 4. These spaces A–C are in communication with the cylindrical passage 45. In order to disconnect the spaces A–C from the cylindrical passage 45, a plurality of annular seal members 70–73 are provided. In particular, the seal member 70 is resiliently fitted in the small opening between the bevel gear 12 accommodated in the space A and the first wrist portion 3. The seal member 71 is resiliently fitted in the small opening between the bevel gear half 21 of the bevel gear body 20 accommodated in the space B and the first wrist portion 3. The seal member 72 is resiliently fitted in the small opening between the bevel gear half 22 and the second wrist portion 4. The seal member 73 is resiliently fitted in the the small opening between the bevel gear 32 held in the space C and the second wrist portion 4. These seal members together form a interior space 75 between the inner surface of the cylindrical passage 45 and the outer surface of the cylindrical member 50. The space 75 is filled with lubricant 76 such as oil or grease in order to reduce the frictional resistance due to contact between the cylindrical member 50 and the cylindrical passage 45.

In the present embodiment, the assembled wrist 1 for an industrial robot is constructed as described thus far. The mechanism for imparting flexibility to the cylindrical member 50 of the assembled wrist 1 is next described by referring to FIGS. 1 and 3. We assume for convenience of illustration that the assembled wrist 1 is initially in the condition shown in FIG. 1.

(1) When the second driver tube 8 is rotated through 180° in the direction indicated by the arrow D in FIG. 1 without rotating the first driver tube 7 and the third driver tube 9 in the final-axis arm 2, the bevel gear 15 is rotated. Then, the bevel gear 26 in mesh with the bevel gear 15 is rotated. The second wrist portion 4 fixed to the bevel gear 26 is rotated about the second axis 30 by the bearing 24 in the same direction as the second drive tube 8 is rotated. At this time, a meshing point varies, where the bevel gear 22 is in mesh with the bevel gear 32 fixedly secured to the tool support portion 5. As a result, the tool support portion 5 is rotated in a direction opposite to the direction of rotation of the second wrist portion 4. Accordingly, as shown in FIG. 3(a), when the second wrist portion 4 is rotated, the tool support portion 5 rotates independent of the direction of rotation of the second driver tube 8, i.e., in a direction opposite to the second driver tube 8. And then the third driver tube 9 also rotates in the same direction as a rotation of the tool support portion 5 because the third driver tube 9 is connected to the tool support portion 5 with the bevel gear 32, the bevel gear body 20 and so on. As a consequence, the assembled wrist 1 is bent downward without twisting the cylindrical member 50. Hence, desired working posture is obtained.

(2) As shown in FIG. 3(a), when the second wrist portion 4 and the tool support portion 5 are rotated respectively and then the assembled wrist 1 is bent downward, i.e., the tool support portion 5 is brought to the desired working posture, the cylindrical passage 45 is similarly bent. At this time, the cylindrical member 50 deforms according to this state of the cylindrical passage 45 while the friction with the cylindrical passage 45 is reduced by the lubricant 76 in the interior space 75. More specifically, both ends 50A and 50B of the cylindrical member 50 are sealed. As shown in FIG. 3(b), the assembled wrist 1 has a curved portion 100 on the side of the space A for accommodating gears. The curved portion 100 has an inner surface 50b and an outer surface 50a. On the inner surface 50b, the concave portions 60 and convex portions 61 of the corrugations 62 are shrunk. On the outer surface 50a, the concave portions 60 and convex portions 61 of the corrugations 62 are stretched and folded. The first wrist portion 3 has a curved portion 101 on the side of the space B for accommodating gears. The curved portion 101 has an outer surface 50a and an inner surface 50b. As shown in FIG. 3(c), on the outer surface 50a, the concave portions 60 and convex portions 61 of the corrugations 62 are shrunk, while on the inner surface 50b, the concave portions 60 and convex portions 61 of the corrugations 62 are stretched and folded. In this way, flexibility is given to the assembled wrist. The cylindrical member 50 is deformed according to the bend state of the assembled wrist 1.

When the third driver tube 9 is rotated through 180° in the direction indicated by the arrow D in FIG. 1 without rotating the first driver tube 7 and the second driver tube 8 of the final-axis arm 2, or when the first driver tube 7 is rotated through 180° in the direction indicated by the arrow D in FIG. 1 without rotating the first driver tube 7 and the second driver tube 8 in the final-axis arm 2, the cylindrical member 50 can deform according varying posture of the assembled wrist 1, i.e., in step with the rotation of the driver tubes 7, 8, 9. Since these are matters of course, it is not described here.

In this way, in the present invention of the assembled wrist 1 for an industrial robot, the cylindrical member 50 for protecting hoses, cables, conduits, etc. for supplying air and electric power extends along the whole cylindrical passage 45 between the third driver tube 9 in the final-axis arm 2 and the tool support portion 5. Both ends 50A and 50B of the cylindrical member 50 are fixed and sealed to the third driver tube 9 and the tool support portion 5, respectively. In addition, a flexibility mechanism is equipped at least around both ends 50A and 50B of the cylindrical member 50 in order to permit the assembled wrist to be deformed according to the rotation of the third driver tube 9 and the tool support portion 5.

Accordingly, when the hoses, cables, conduits, etc. for supplying air and electric power are laid in the cylindrical member 50 disposed within the passage 45, lubricant supplied for smoothing the rotation of bearings and other components and dust entered from outside the machine are not directly in contact with the hoses and so on. So, the hoses and so on would not be affected from the lubricant etc. Furthermore, even if the third driver tube 9 or the like rotates, the cylindrical member 50 deforms according to the rotation. A shearing force produced by relative rotation occurring at the joint potion of the wall forming the passage 45 does not directly act on the hoses etc. Hence, the hoses, cables, etc. are prevented from being deteriorated.

There are the seal members 70–73 in the accommodating spaces A–C for closing off the small openings going to the cylindrical passage 45. These seal members cooperate with the cylindrical member 50 for ensuring that the cylindrical passage 45 is hermetically sealed. This makes it possible to inject the lubricant 76 into the interior space 75 between the inner surface of the cylindrical passage 45 and the outer surface of the cylindrical member 50. Hence, the assembled wrist allows the cylindrical member 50 to be deformed according to the rotation of the first wrist portion 3 or the like while reducing the friction with the cylindrical passage 45 by the injected lubricant 76.

As a result, it is assured that the lubricant supplied to the gears 12, 15, 20, 21, etc. and to the bearings 11, 14, 24, etc. and dust outside the machine do not enter the cylindrical passage 45 while reducing the damage and deterioration due to the friction between the cylindrical member 50 and the cylindrical passage 45. Also, The hoses, cables, conduits, etc. disposed in the cylindrical passage 45 can be guarded against harsh external environment by the cylindrical member 50.

In the present invention of the assembled wrist 1 for use on an industrial robot, the lubricant 76 is injected into the interior space 75 so as to diminish the friction between the cylindrical member 50 and the cylindrical passage 45 and reduce the damage and deterioration. It is to be noted that the present invention is not limited to this scheme. For example, as shown in FIG. 4, an annular slight-sliding motion member 80 may be equipped to the third driver tube 9, the bevel gear body 20, and the bevel gear 32 so as to protrude into the interior space 75. Whereby the friction between the cylindrical member 50 and the cylindrical passage 45 would be reduced and the damage and deterioration of hoses and so on are decreased. The cylindrical member 50 is fitted on to the inner surface of the annular slight-sliding motion member 80. A sleeve having a lubricating member on its inner surface, a rolling or ball bearing capable of rotating in the direction of sliding movement, or the like can be suitably used as the slight-sliding motion member 80.

Since the cylindrical member 50 receives only low frictional resistance from the annular slight-sliding motion member 80, the damage and deterioration of the cylindrical member 50 are reduced. At the same time, the lubricant supplied to the gears 12, 15, 20, 21, etc. and to the bearings 11, 14, 24, etc. and dust outside the machine are not passed into the cylindrical passage 45. The cylindrical member 50 can guard the hoses, cables, conduits, etc. disposed in the cylindrical passage 45 against harsh external environment.

In the assembled wrist 1 of the present embodiment, the cylindrical member 50 acting as a protective member is not limited to the illustrated structure. Any desired protective member may be used as long as it can hold the cylindrical passage 45 sealed and it can deform according to the rotation of the first wrist portion 3, the second wrist portion 4, and the tool support portion 5.

INDUSTRIAL APPLICABILITY

As described thus far, the present invention is applicable to the assembled wrist for an industrial robot comprising three independent axes of rotation which cross at two points apart from each other, a first housing, a second housing, and a tool support member capable to rotate about the three axes of rotation respectively by mechanical components such as gears, bearing and so on, and a cylindrical passage formed inside of the first housing, the second housing, and the tool support member arranged in series.

Particularly, the present invention is suitable as the assembled wrist for an industrial robot, capable of protecting hoses, cables, conduits, etc. disposed in the cylindrical passage from a harsh external environment.

We claim:

1. An assembled wrist for use on an industrial robot having an arm, comprising;
   a first axis;
   a second axis intersecting said first axis;
   a third axis intersecting said second axis;
   a first wrist portion of which one end is connected to the arm of the industrial robot, and which is rotated about said first axis by a mechanical component so as to form a first space around said first axis;
   a second wrist portion of which one end is connected to other end of said first wrist portion, and which is rotated about said second axis by a mechanical component so as to form a second space around the second axis;
   a tool support portion of which one end is connected to other end of said second wrist portion, and which is rotated about said third axis by a mechanical component so as to form a third space around said third axis;
   a passage formed by said first, second and third spaces arranged in series; and
   a protective member of which both ends are fixed and sealed to the arm of the industrial robot and said tool support portion respectively so that said protective member may be disposed in said passage and laid along a whole length of said passage, and which has flexible components deforming according to the rotations of the arm and said tool support portion.

2. The assembled wrist for use on an industrial robot as set forth in claim 1, wherein said protective member is made of an elastically deformable material such as rubber or resin and has continuous corrugations at least near said fixed and sealed ends.

3. The assembled wrist for use on an industrial robot as set forth in claim 2, wherein said first wrist portion, said second wrist portion and said tool support portion forming said passage are provided with seal members in order to close small openings which open from said passage towards outside.

4. The assembled wrist for use on an industrial robot as set forth in claim 2, wherein said protective member is guided by a sliding member disposed inside said passage.

5. The assembled wrist for use on an industrial robot as set forth in claim 1, wherein said protective member is guided by a sliding member disposed inside said passage.

6. The assembled wrist for use on an industrial robot as set forth in claim 1, wherein said first wrist portion, said second wrist portion and said tool support portion forming said passage are provided with seal members in order to close small openings which open from said passage towards outside.

7. The assembled wrist for use on an industrial robot as set forth in claim 6, wherein said protective member is guided by a sliding member disposed inside said passage.

8. The assembled wrist for use on an industrial robot as set forth in claim 6, wherein an interior space created between wall of said passage and outer surface of said protective member is filled with lubricant.

9. The assembled wrist for use on an industrial robot as set forth in claim 8, wherein said protective member is guided by a sliding member disposed inside said passage.

10. An assembled wrist for use on an industrial robot having a final-axis arm, comprising;

first, second, and third driver tubes coaxially arranged in this order from outside and disposed in a final-axis arm of the robot;

a first wrist portion connected to said first driver tube and rotated about a first axis by a mechanical component so as to form a first space around said first axis;

a second wrist portion of which one end is connected to said second driver tube with gears equipped inside of said first wrist portion and which is rotated about a second axis by a mechanical component so as to form a second space around said second axis which intersects said first axis;

a tool support portion of which one end is connected to said third driver tube with gears equipped inside of said first and second wrist portions and other end is connected to a working tool, and which is rotated about a third axis by a mechanical component so as to form a third space around said third axis which intersects said second axis;

a passage formed by said above first, second and third spaces arranged in series, which extends from said third driver tube in the final-axis arm to one end surface of said tool support portion; and a protective member of which both ends are fixed and sealed to said third driver tube and said tool support portion respectively so that said protective member may be disposed in said passage, and which has flexible components at least near said fixed and sealed ends of which said flexible component deforms according to the rotations of said third driver tube and said tool support portion.

11. The assembled wrist for use on an industrial robot as set forth in claim 10, wherein said protective member is made of an elastically deformable material such as rubber or resin and has continuous corrugations at least near said fixed and sealed ends.

12. The assembled wrist for use on an industrial robot as set forth in claim 10, wherein said first wrist portion, said second wrist portion and said tool support portion forming said passage are provided with seal members in order to close small openings which open from said passage towards outside.

13. The assembled wrist for use on an industrial robot as set forth in claim 10, wherein said protective member is guided by a sliding member disposed inside said passage.

* * * * *